Nov. 3, 1970     F. M. WOOD ET AL     3,538,433
APPARATUS FOR DISCRIMINATING BETWEEN INSIDE AND
OUTSIDE DEFECTS USING A COMBINED LEAKAGE
FIELD AND EDDY CURRENT TEST SYSTEM
Filed July 15, 1968                    5 Sheets-Sheet 1

Fenton M. Wood
Alfred E. Crouch
INVENTORS

BY Arnold, Roylance & Harris

ATTORNEYS

Fenton M. Wood
Alfred E. Crouch
INVENTORS

Fenton M. Wood
Alfred E. Crouch
INVENTORS

BY Arnold, Roylance,
Kruger & Durkee

ATTORNEYS

United States Patent Office 3,538,433
Patented Nov. 3, 1970

3,538,433
APPARATUS FOR DISCRIMINATING BETWEEN IN-SIDE AND OUTSIDE DEFECTS USING A COMBINED LEAKAGE FIELD AND EDDY CURRENT TEST SYSTEM
Fenton M. Wood, Sugarland, and Alfred E. Crouch, Houston, Tex., assignors to American Machine & Foundry Co., New York, N.Y., a corporation of New Jersey
Continuation-in-part of application Ser. No. 292,630, July 3, 1963. This application July 15, 1968, Ser. No. 752,092
Int. Cl. G01r 33/12
U.S. Cl. 324—37                    1 Claim

ABSTRACT OF THE DISCLOSURE

This invention includes non-destructive methods and apparatus for detecting flaws in the wall of a magnetized steel pipe and the like. A detector assembly composed of a pair of closely spaced-apart eddy current sensing coils are arranged to scan one surface of the pipe, and a flux leakage coil is arranged between the eddy current coils, whereby all three coils simultaneously scan the same discrete portion of the pipe confronted by the coils. Alternatively, an eddy current coil may be disposed between two flux leakage coils.

---

This is a continuation-in-part of a copending patent application Ser. No. 292,630, which was filed July 3, 1963.

This invention relates to a magnetic inspection apparatus and method utilizing two types of magnetic fields to coincidentally test the same portion of a magnetizable member. More particularly, the invention relates to a magnetic inspection apparatus and method for continuously testing a magnetizable tubular member, wherein the wall of said member is coincidentally tested by two types of magnetic fields and a logic circuit is provided which indicates the relative size and location of defects in the tubular member.

In the magnetizable pipe inspection art, there has long been a need for a relatively simple apparatus and method which could be used to inspect such members and provide an accurate indication of the relative size and location of defects in said pipe, i.e., whether the defect was an inside defect or an outside defect. In this application, the term outside defect will be used to denote a defect which opens to the outside surface of the pipe or the surface adjacent to which the inspection means is employed. The term inside defect will be used to denote defects which open to the inside surface of a pipe or the surface opposite to which the inspection means is employed and/or, defects which are included within the wall of the pipe and do not open to either surface of the pipe wall.

One of the reasons that the determination of the relative size and location of a flaw in a pipe is rendered difficult is because an inside flaw of a given magnitude will, because of its greater distance from the scanning device, give a different reading than an outside defect of the same magnitude. Hence, knowledge of the location of the defect permits more accurate evaluation of a particular flow which the signal represents.

Thus, for example only, in the manufacturing of pipe wherein the metal is rolled to the desired shape and the abutting edges are thereafter welded together, a weld line is created. This weld line is quite often formed with either inside or outside defects, or both, if the welding operation is not carried out under proper conditions. Therefore, an inspecting apparatus which can continuously indicate defects and provide information as to the relative size and location of such defects, is very valuable to the pipe manufacturing art, since it will permit the operator of the welding equipment to quickly adjust his welding conditions to avoid forming pipe with defects above specified tolerances. The particular corrective mill adjustments that will have to be made will, of course, depend upon whether the defects occurring in the pipe being formed are inside or outside defects.

Many prior art apparatuses and methods are available for magnetically inspecting pipe, but none is fully satisfactory to the extent of the present invention for various reasons. Some prior art apparatuses employ two methods of testing but are not continuous in their operation, require the use of a delay circuit because the two types of inspecting techniques are not employed coincidentally over the same portion of wall pipe, or are in other respects not as fully satisfactory as the present invention.

It is therefore an objective of this invention to provide an apparatus and method for inspecting magnetizable tubular members for defects and providing a readout as to the location of said defects.

Another object of this invention is to provide an apparatus and method of the type characterized above wherein two types of magnetic inspections are used coincidentally to test the same area of pipe wall, thus providing coincidental indications of both inside and outside defects and eliminating the need for delay or cut-out circuits.

These and other objectives of the invention will become apparent, with the description of the invention.

In its broadest concept, the present invention contemplates an apparatus and method for testing magnetizable tubular goods, such as pipe, for defects in the wall of said pipe, which apparatus and method employs both a unidirectional magnetic field, such as a circumferential magnetic field, and another magnetic field employing eddy currents, both magnetic fields being employed coincidentally in the same area of the wall of the pipe being inspected.

Magnetic responsive means are provided which means are responsive to flux leakage from the unidirectional field as indications of inside and outside defects, and to variations in eddy currents which variations are primarily indicative of outside defects.

A logic circuit is provided which utilizes signals generated by the magnetic responsive means to provide a readout as to whether or not a defect is inside or outside. This logic circuit is arranged to show the relative size of the defect in addition to its location, thus indicating whether or not the defect is above a specified level.

As will be apparent to those skilled in this art, there are many particularly useful applications of the present invention, wherein it is either undesirable or impractical to scan both the inside and outside surfaces of a steel pipe or other hollow cylindrical body of like character, but wherein it is necessary to detect all pits or other similar flaws irrespective of where they may be located.

The first problem area involves the production of new pipe or tubing in the rolling mill, wherein it is necessary to check each length or joint of pipe for minute cracks or weld discontinuities, which may constitute a dangerous weakness in the pipe wall, but which may not be visible in the outside surface of the pipe. In the test procedures of the prior art, it has been necessary to carefully scan both the inside surface as well as the outside surface of the pipe in order to ascertain that all significant flaws have been detected. Since it is a time consuming operation to scan both surfaces this has substantially increased the cost of producing the pipe.

As hereinbefore stated, the present invention involves scanning only one surface of the pipe to find all flaws. Accordingly, a detector including both a flux leakage sensing coil, and at least one eddy current sensing coil closely spaced thereto, is arranged to scan only the exterior surface of a magnetized pipe length to detect both surface and internal flaws. Thus, a comprehensive test may be made within less than half the time required with the techniques of the prior art.

Figure 1:
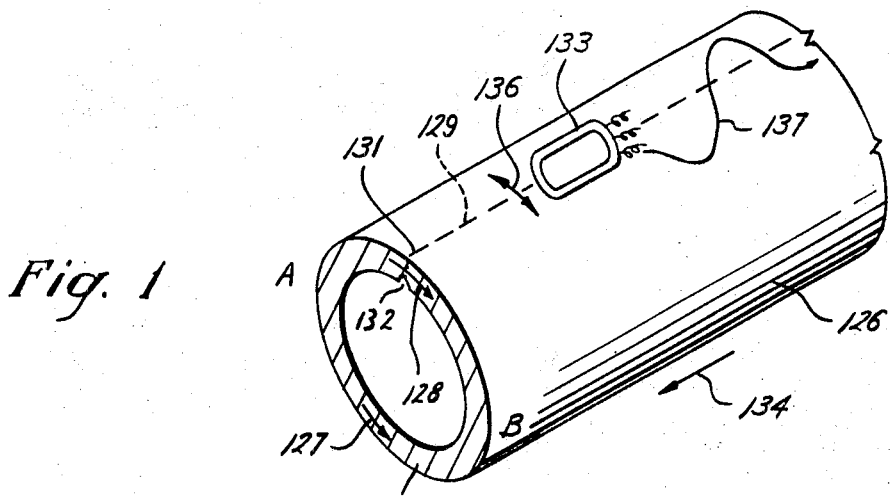
FIG. 1 is a simplified schematic view of a pipe having a weld line being inspected with a search coil assembly positioned adjacent thereto.

Referring to FIG. 1, there is generally shown a magnetizable tubular member in the form of pipe 126. A unidirectional magnetic field is established therein as shown by arrows 127 and 128. This field may be established by a magnet with the south pole positioned at letter B and the north pole positioned at letter A. In the alternative, the unidirectional magnetic field could be circumferential and produced by usual means, as is well known to those skilled in the art.

Pipe 126 has weld line 129, where the pipe was formed by electrical resistance welding. This type of welding, unless carried out under carefully controlled conditions, may create certain defects in pipe wall 130. Two such defects are shown in FIG. 1. Outside crack 131 is one, and internal offset weld 132 is another.

Search coil assembly 133 is a diagrammatic illustration of the magnetic responsive means of the invention, and will be explained in detail below. Ordinarily, pipe 126 would be moving in the direction of arrow 134 relative to assembly 133. Coil assembly 133, in this embodiment, would be oscillated back and forth across weld line 129 as shown by double arrow 136. The result is that coil assembly 133 would follow a path indicated by curved arrow 137 with respect to the surface of pipe 126 as inspection continued. This type of searching is done when the defects being detected are primarily longitudinal to the long axis of the pipe.

Figure 2:
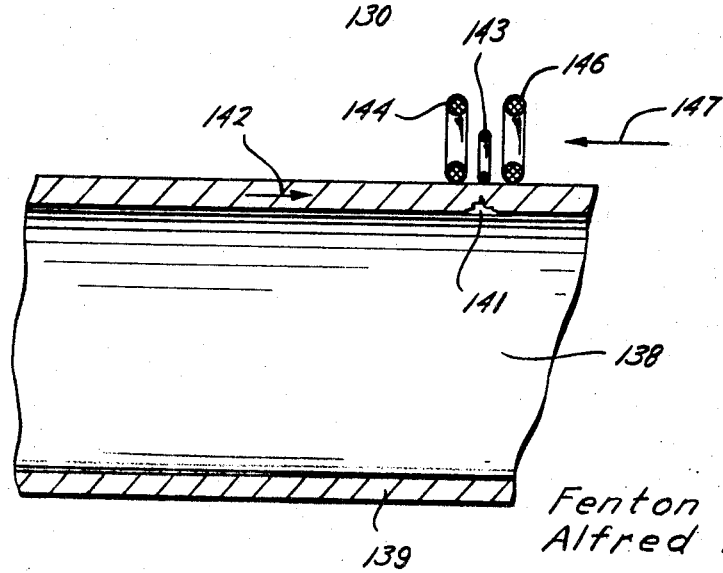
FIG. 2 is a simplified central vertical section of a schematic view of another pipe, such as drill pipe, being inspected with magnetic responsive means and showing the use of a longitudinal magnetic field.

FIG. 2 schematically shows the method of inspecting pipe, such as drill pipe 138, for transverse cracks in wall 139, such as inside crack 141. A unidirectional magnetic field is established in wall 139, which field is longitudinal with respect to pipe 138, as is shown by arrow 142.

The magnetic responsive means of the invention are here shown as flux leakage coil 143 positioned between eddy current coils 144 and 146. Eddy current coils 144 and 146 would normally be multi-turn coils spaced apart a small distance, with flux leakage coil positioned therebetween, so that it may be said that variations in flux leakage and variations in eddy currents are being coincidentally detected. Coils 143, 144 and 146 would, of course, be moved in the direction of arrow 147 relative to pipe 138. It is to be understood that a number of such magnetic responsive means could be employed around pipe 138 so that the full circumference thereof could be inspected in one sweep.

Figure 4:
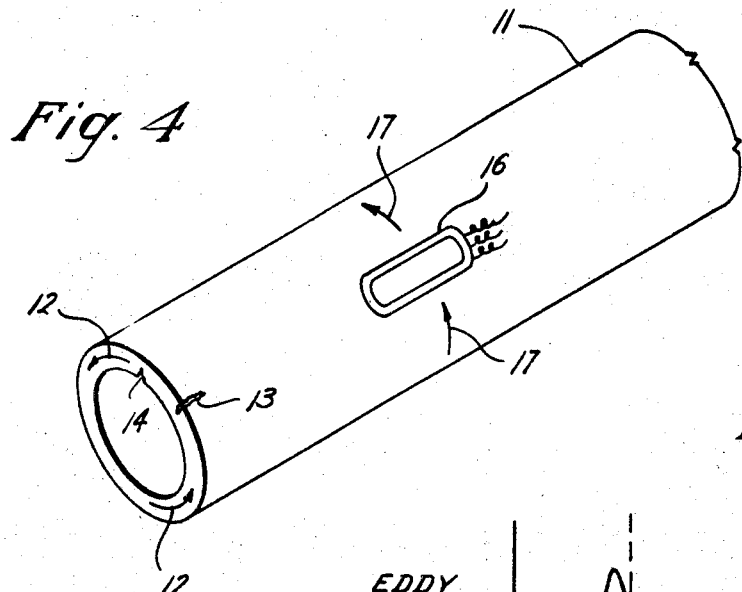
FIG. 4 is an isometric schematic view of a pipe with a circumferential magnetic field and a magnetic responsive means being moved circumferentially with respect thereto.

Referring to FIG. 4 there is shown another magnetizable tubular member as metal pipe 11, having a unidirectional magnetic field established therein in the form of a circumferential magnetic field indicated by arrows 12, 12. Pipe 11 has outside defect 13 and inside defect 14. The circumferential magnetic field may be either a residual field, or an active field, but the latter is preferred because of its greater sensitivity.

Magnetic responsive means are diagrammatically shown in the form of search coil assembly 16 which in actual practice would preferably be at least two coils, as will be explained hereinafter. Assembly 16 is adapted to produce eddy currents in pipe 11 and also to detect flux leakage from the circumferential magnetic field. Assembly 16 is positioned at a point closely adjacent the external surface of pipe 11 and is mounted to be moved circumferentially with respect to pipe 11 as indicated by arrows 17, 17. It is to be understood that the movement contemplated is relative movement wherein either the coil assembly can be moved, or the pipe may be moved, or both may be moved. Furthermore, the movement of assembly 16 would be axial relative to pipe 11, so that assembly 16 would progressively scan the entire length of pipe 11.

In operation, circumferential magnetic field shown by arrows 12, 12 would be produced by conventional means, for example, electromagnetic means (not shown). Flux leakage from the pipe resulting from defects in the wall of pipe 11 generate first defect signals in the form of voltages in the coils of coil assembly 16 as is well known to those skilled in the art. These voltages are generated whenever the coils of coil assembly 16 pass through lines of flux caused by flux leakage from the direct current magnetic field. Since such flux leakage is occasioned by both inside and outside defects, an additional magnetic responsive means is provided to discriminate between inside and outside flaws.

Thus, second defect signals in the form of voltage responses are produced by an eddy current technique. Many eddy current sytems are widely used and known in the inspecting art, as for example, those shown in U.S. Pat. No. 2,574,311 issued to Zuschlag and/or that shown in Nondestructive Testing Handbook, edited by Robert C. McMaster, The Ronald Press Company, New York, 1959, volume II, p. 40.7, FIG. 4.

For example, a bridge eddy current circuit could be used wherein the search coils of assembly 16 are energized by an alternating current which, for example, may have a frequency of 50 kilocycles per second. As is well known to those skilled in the art, the sensitivity of the eddy current method can be limited to a small depth into the pipe by frequency selection and may be adjusted to give a penetration on the order of a few thousandths of an inch.

Thus, one novel feature of the present invention is that two signals are coincidentally derived from the same portion of the wall of the pipe being inspected.

Since signals generated by the eddy current technique can be limited to outside defects of a given size, and since the flux leakage technique using direct current magnetization is sensitive to both inside and outside defects, then two outputs can be taken from coils of coil assembly 16.

Figure 5:
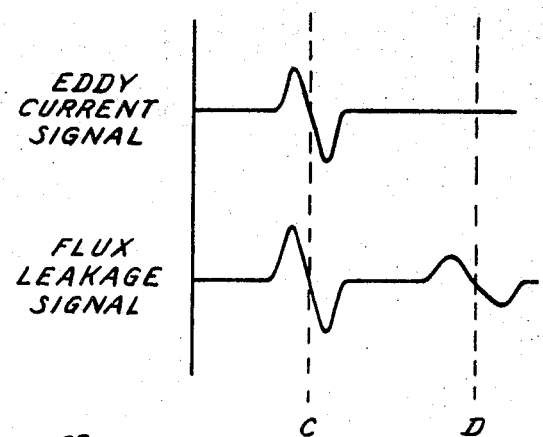
FIG. 5 is a graph showing the signal output from the magnetic responsive means of this invention.

Thus, when coil assembly 16 scans pipe 11, two outputs can be taken from coils of coil assembly 16, one representing variations in flux leakage, and one representing variations in eddy currents. These outputs are illustrated in FIG. 5. At position C with respect to pipe 11, both the flux leakage response and the eddy current response are shown. This would indicate that the defect is an outside defect. At coil position D, there is only a flux leakage signal thus indicating an inside defect.

Furthermore, the frequency of the eddy current carrier and the flux leakage signal are markedly different, which will permit certain filtering techniques, as will be explained hereinafter. The flux leakage signals contain predominantly low frequencies and perhaps on the order of 50–100 cycles per second, whereas the eddy current carrier signal is a high frequency and may be on the order of 500–100,000 cycles per second.

Figure 6:
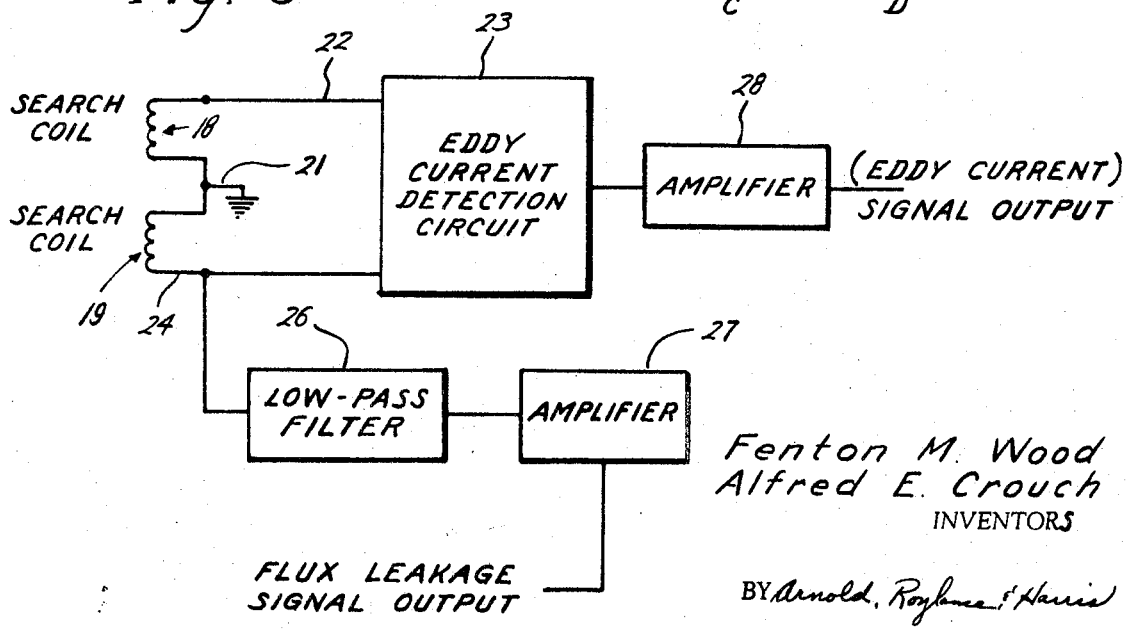
FIG. 6 is a block diagram of one type of magnetic responsive means of this invention, particularly showing diagrammatically one embodiment of the search coils of this invention.

The specific arrangement of the magnetic responsive means shown as coil assembly 133 in FIG. 1, coils 143, 144, 146 of FIG. 2 and assembly 16 of FIG. 4 may take any one of several forms but all will be similar in that they will coincidentally detect variations in flux leakage and variations in eddy currents. Referring to FIG. 6, the block diagram shows a pair of search coils 18 and 19 diagrammatically. These coils may be either parallel and spaced apart a small distance or concentric with respect to each other. In any event, both coils are used to form the eddy current bridge circuit and one of the coils is used to detect flux leakage. These coils are positioned adjacent the pipe surface being inspected as shown in FIG. 1. Hence, it may be said that this pair of coils has a first lead 21 which is common to both coils of the pair, a second lead 22 connecting coil 18 to eddy current detection circuit 23, and a third lead 24 connecting coil 19 to eddy current detection circuit 23 and low-pass filter 26.

As indicated above, the eddy current carrier is of a very high frequency perhaps on the order of 20 kilocycles per second and perhaps being as high as 20 volts, whereas the flux leakage signal may be on the order of 100 cycles per second and have only a few millivolts amplitude.

It is therefore possible to separate the two signals carried by lead 24 by the use of low-pass filter 26, which is selected to pass the flux leakage signal and at the same time attenuate the higher frequency eddy current carrier voltage. It is important that the input impedance of the filter be quite high so that there will be no adverse loading effects on the eddy current detection circuit. It should be understood that low-pass filter 26 could as easily be connected to lead 22, and in fact could be connected to both leads 22 and 24 and a differential signal be obtained.

The signal from the low-pass filter is transmitted to amplifier 27 which produces a flux leakage signal output representative of both inside and outside defects.

The eddy current detection circuit 23 produces a signal which is transmitted to amplifier 28, which produces eddy current signal outputs representative of outside defects.

Thus, FIG. 6 illustrates one arrangement of the magnetic responsive means of this invention. Another form of the magnetic response means of this invention is diagrammatically shown in FIG. 3 which is similar in operation to coils 143, 144 and 146 of FIG. 2.

Figure 3:
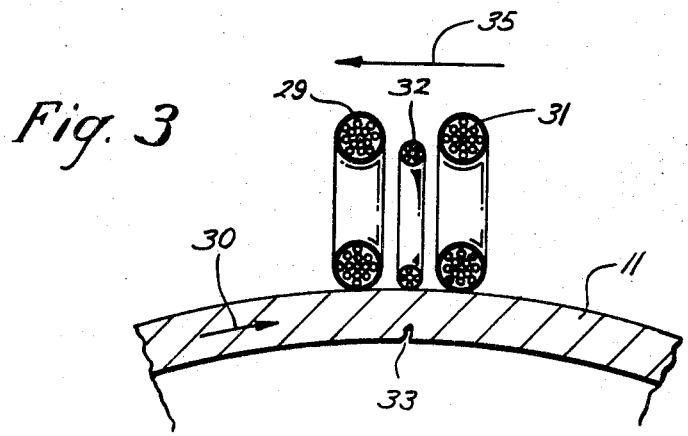
FIG. 3 is a simplified cross section schematic view of a pipe being inspected by magnetic responsive means and showing the use of a magnetic field similar to that shown in FIG. 1.

FIG. 3 shows a magnetic responsive means which illustrates a high resolution inspection system for very definitive inspection. Eddy current coils 29 and 31 are multiturn coils oriented as there shown, perpendicular to the pipe surface being inspected. The flux path is shown by arrow 30 and the direction of the movement of the search coils by arrow 35. Flux leakage coil 32 is a smaller coil of wire positioned between eddy current coils 29 and 31. This positioning and movement of coils 29, 31 and 32 is preferred when the defects being searched for are primarily longitudinal with respect to the long axis of the pipe.

Again, it will be observed that both eddy current coils 29 and 31 and flux leakage coil 32 are coincidentally searching over the same identical portion of the wall of pipe 11. This is important since, in order for the logic circuit of this invention to operate correctly the flaw signals from the eddy current technique and from the flux leakage technique should occur at substantially the same instant.

In the arrangement of FIG. 3, flux leakage coil 32 produces an electrical signal which is thereafter led to amplifier means (not shown). Voltages produced by defects detected by eddy current coils 29 and 31 are also led to amplifier means (not shown). Flux leakage coil 32 detects both inside and outside defects, while eddy current coils 29 and 31 detect primarily only outside defects. Hence, only flux leakage coil 32 would respond to crack 33, shown in the internal wall of pipe 11 in FIG. 3.

The outputs of any of the search coil configurations illustrated in FIGS. 1, 2, 3, 4 or 6 could be used to operate a logic circuit connected to electrical control devices or indicator devices which would indicate whether the defect was either inside or outside.

Figure 7:
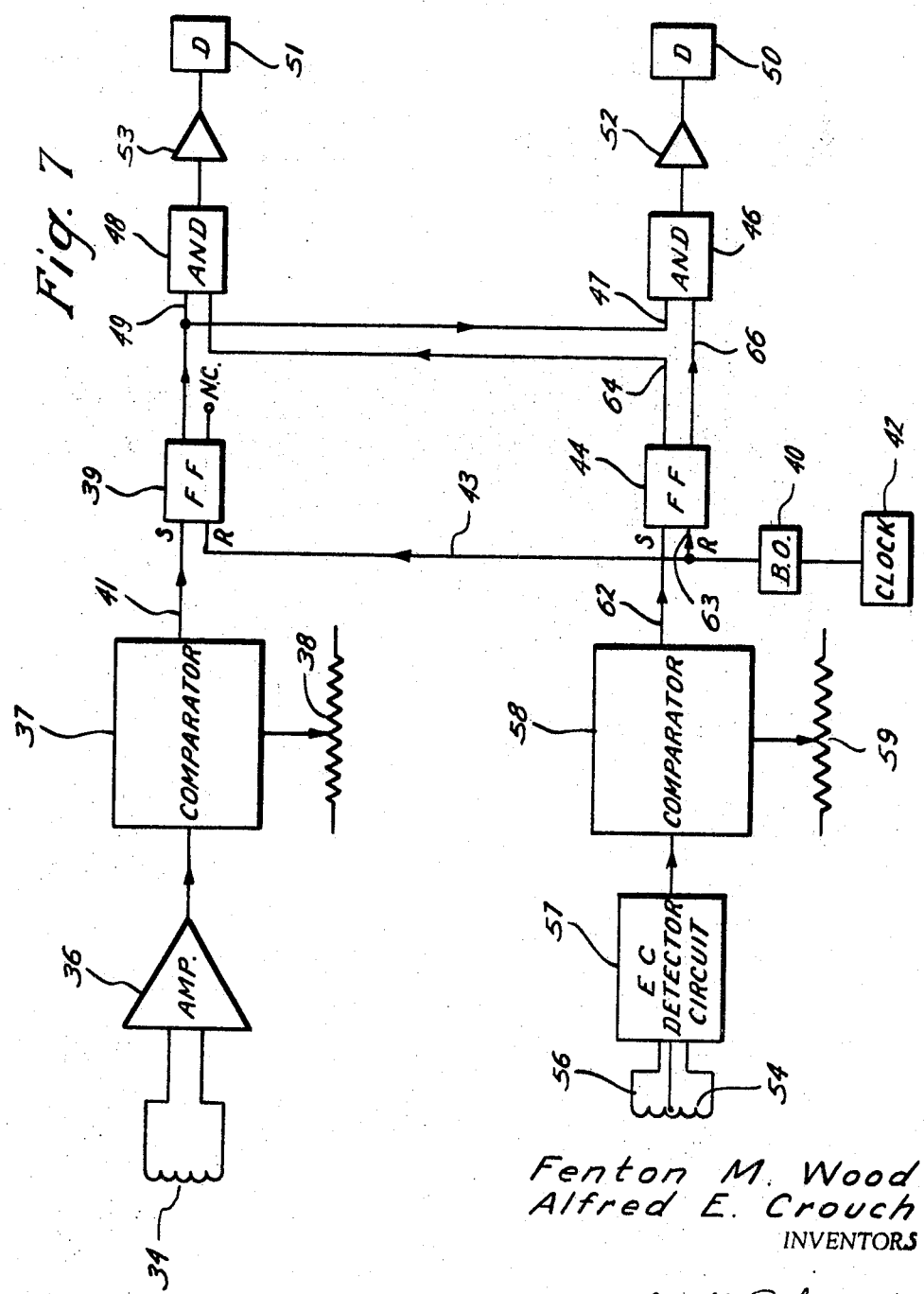
FIG. 7 is a block diagram illustrating one embodiment of the readout or logic circuit of the invention.

One form of the logic circuit of this invention is shown in FIG. 7. Flux leakage search coil 34, performing in the same manner as coils 19, 32 or 143, detects variations in flux leakage from the pipe being inspected. Voltages induced in coil 34 are amplified by amplifier 36, to provide electrical signals to comparator 37 set at a preselected trigger level, such as a reject level for example, by means of potentiometer 38. Comparator 37 is of the Schmitt trigger type shown in Military Standardization Handbook 215, Selected Semiconductor Circuits, Dept. of Defense, USA, June 15, 1960, Circuit 6–18, p. 6–63. Potentiometer 38 is set such that there will be electrical output impulses from compaartor 37 only if the flaw signal from coil 34 and amplifier 36 is above a preselected level.

The output impulses of comparator 37 are transmitted to flip-flop 39 to lead 41, with the letter S shown thereon indicating the set position. Flip-flops 39 and 44 are of standard construction such as that shown in Military Standardization Handbook 215. Selected Semiconductor Circuits, Dept. of Defense, USA, June 15, 1960. Circuit 6–6, p. 6–38.

Clock 42 is of the type illustrated in circuits 6–13 on p. 6–52 of Military Standardization Handbook 215 cited above and is an astable multivibrator and is arranged to transmit an electrical impulse through a reset pulse generator such as blocking oscillator 40 (of the type shown in circuit 6–19, p. 6–66 of Military Standardization Handbook 215 cited above) to flip-flop 39 via lead 43. The letter R on lead 43 adjacent to flip-flop 39 denotes a reset position. Blocking oscillator 40 is arranged to transmit an impulse to flip-flops 39 and 44 at stated intervals, such as once each second or it may be activated in response to the movement of each foot of pipe being inspected, or the like.

Flip-flop 39 is connected to a first electrical circuit conveniently shown in the form of AND circuit 48 by lead 49 and a second electrical circuit shown in the form of AND circuit 46 by lead 47. AND circuits 46 and 48 are circuits of the type shown in the book Pulse and Digital Circuits by Millman and Taub, McGraw Hill Book Co. Inc., N.Y., 1956, FIG. 13–8, p. 398, and are arranged to produce single outputs to controlled electrical devices 50 and 51, respectively, via relay amplifiers in the form of power amplifiers 52 and 53, respectively.

Controlled electrical devices 50 and 51 may be in the form of colored lights, spray guns, card punchers, magnetic tape recording means or the like.

Eddy currents search coils 54 and 56, operating just as coils 18 and 19, or 29 and 31, or 143 and 145, previously explained and positioned coincidentally over the same pipe surface as flux leakage search coil 34, are connected to eddy current detection circuit 57 of the type previously described. Variations in eddy currents caused by outside defects are utilized to produce amplified signals which are transmitted to comparator 58, which is of the same type as comparator 37 and is controlled by potentiometer 59, set at a preselected level.

The output of comparator 58 is applied to flip-flop 44 by lead 62, with the letter S thereon indicating the set position. Controlled electrical impulses from blocking oscillator 40 are likewise transmitted to R input of flip-flop 44 by lead 63.

In the set position flip-flop 39 produces an output on leads 47 and 49. In reset position flip-flop 39 has output to NC (no connection). Flip-flop 44 in the set position has an output to lead 64, and in the reset position transmits a controlled output on lead 66.

In operation flux leakage search coil 34, in response to either inside or outside defects will produce first electrical signals which are applied to comparator 37 via amplifier 36. Since comparator 37 is controlled by a preselected setting of potentiometer 38 which setting may be at the reject level, impulses are transmitted to flip-flop 39 only when a rejectable defect is detected. Since clock 42 and blocking oscillator 40 will normally cause flip-flop 39 to be in the reset condition, there will normally be no output from flip-flop 39 on leads 47 and 49 until it is set by a signal from comparator 37. When flip-flop 39 is so set, it will then transmit impulses to AND circuits 46 and 48.

If eddy current coils 54 and 56 coincidentally detect an outside flaw, then a signal will be transmitted to comparator 58, which is controlled by potentiometer 59, at a preselected setting. If the eddy current signal is above the preset level, a signal will be transmitted to flip-flop 44, which will then be placed in the set position, and thereby transmit impulses to AND circuit 48, by lead 64, but not to AND circuit 46. If this should occur, then AND circuit 48 would transmit an electrical impulse to amplifier 53 which would energize device 51, therein indicating an outside defect above a certain preselected level.

If eddy current coils 54 and 56 produce no signal above the preselected level, then flip-flop 44 will remain in the reset condition with the result that AND circuit 48 will not be activated, and AND circuit 46 will be activated only by an electrical impulse from flux leakage search coil 34 and a control impulse from flip-flop 44 via lead 66. Thus, AND circuit 46 would transmit an output to amplifier 52 which would energize device 50, thereby indicating an inside defect. After each indication of a defect, clock 42 and blocking oscillator 40 will operate to rest flip-flops 39 and 44, thereby placing the logic circuit in condition to indicate another defect signal. The resetting pulses duration times are so short in comparison with the flaw signals that they will not interfere with the operation of flip-flops 39 and 44 while receiving.

Therefore, it can be seen that this invention provides a logic circuit which can indicate both the relative size and location of defects in a pipe.

Figure 8:
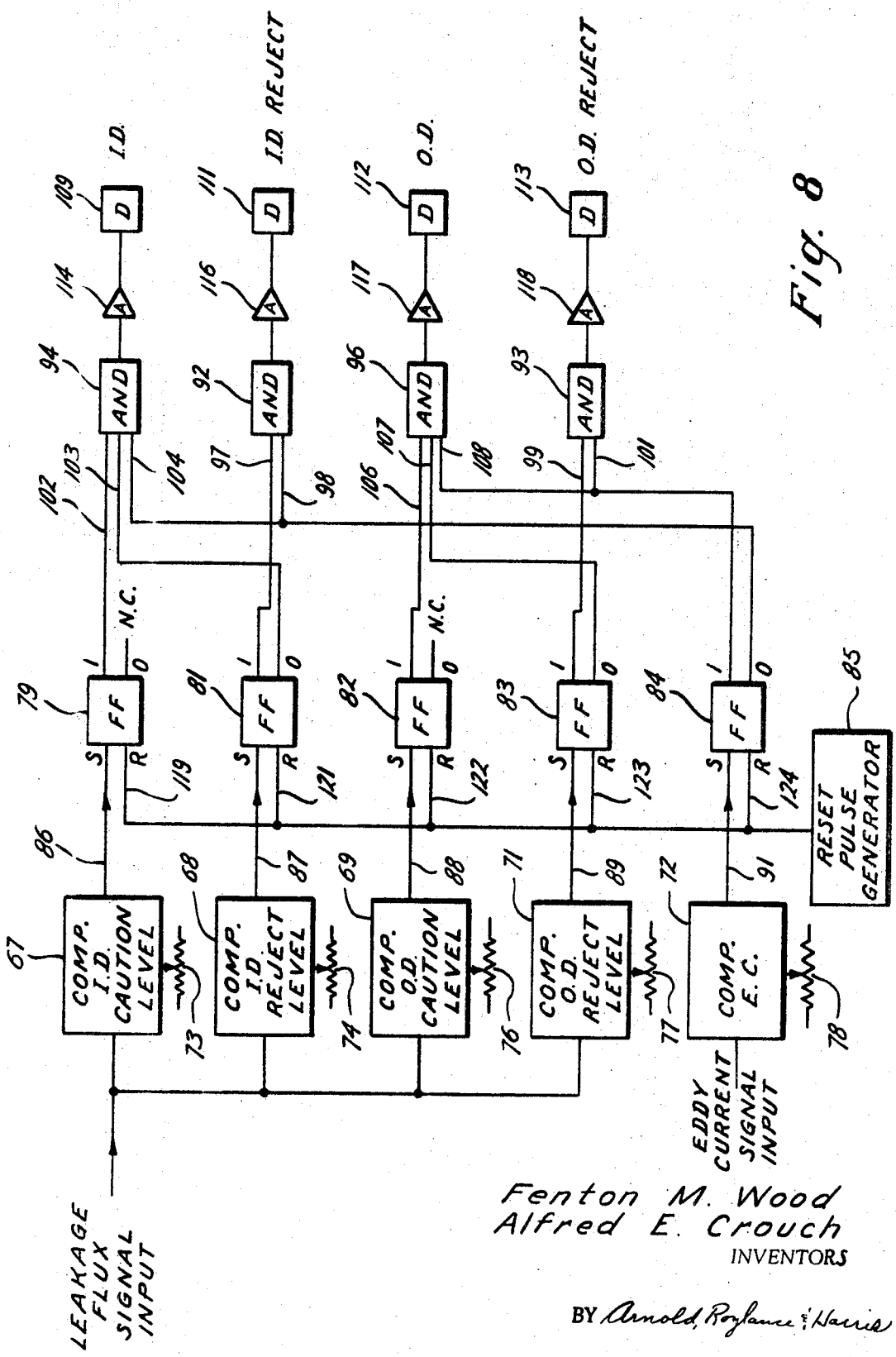
FIG. 8 is a block diagram showing another embodiment of the logic circuit of this invention.

FIG. 8 shows a more sophisticated adaptation of the logic circuit of the invention. Comparators 67, 68, 69 and 71 are similar to comparator 37 in FIG. 7 and comparator 72 is similar to comparator 58 in FIG. 7. Each of comparators 67, 68, 69, 71 and 72 are respectively controlled by potentiometers 73, 74, 76, 77 and 78, which may be set at desired preselected levels.

Comparators 67, 68, 69 and 71 are arranged to receive flux leakage input signals just as comparator 37 in FIG. 7 and comparator 72 is adapted to receive eddy current signal inputs just as comparator 58 in FIG. 7.

Flip-flops 79, 81, 82, 83 and 84 are similar to flip-flops 39 and 44 in FIG. 7 and are respectively connected to comparators 67, 68, 69, 71 and 72 by leads 86, 87, 88, 89 and 91, and are similarly placed in the set position by a signal from the comparator to which they are connected. They are similarly placed in the reset position by reset pulse generator 85 (which may be operated automatically or in synchronism with pipe velocity), connected via leads 119, 121, 122, 123 and 124, respectively, thereby permitting the logic circuit of FIG. 8 to indicate a defcet and then revert to the reset condition and be ready to indicate another defect.

There is a first electrical circuit shown as AND circuit 93 and a second electrical circuit shown as AND circuit 92, which are similar to AND circuits 46 and 48 in FIG. 7 and function in a similar manner. There is also provided an auxiliary first electrical circuit in the form of AND circuit 96 and an auxiliary second electrical circuit in the form of AND circuit 94. AND circuits 94 and 96 are three input circuits.

AND circuit 92 is connected to flip-flops 81 and 84 by leads 97 and 98, respectively.

AND circuit 93 is connected to flip-flops 83 and 84 by leads 99 and 101, respectively.

AND circuit 94 is connected to flip-flops 79, 81 and 84 by leads 102, 103 and 104, respectively.

AND circuit 96 is connected to flip-flops 82, 83 and 84 by leads 106, 107 and 108, respectively.

Controlled electrical devices 109, 111, 112 and 113 are similar to devices 49 and 51 shown in FIG. 7 and are energized by signals from AND circuits 94, 92, 96 and 93, respectively, amplified by relay drivers in the form of power amplifiers 114, 116, 117 and 118, respectively.

In operation comparator 67 would be set to be activated by a flux leakage input signal equal to or above an inside (ID) *caution* defect signal. Comparator 68 would be set to be activated by an inside (ID) *reject* defect signal. Comparator 69 would be set to be activated by an outside (OD) *caution* defect signal. Comparator 71 would be set to be activated by an outside (OD) *reject* defect signal and comparator 72 would be set to be activated by an outside (OD) flaw signal below the caution level.

Assume then that both the flux leakage search coil and the eddy current search coils detect a defect in the pipe, which defect is so serious as to be a reject. The system would then operate in the following manner. There will be an eddy current input above the preset level to comparator 72, which will cause flip-flop 84 to be set, thereby transmitting electrical impulses to AND circuits 93 and 96.

There will also be a flux leakage input signal above a reject level, which will cause comparator 69 and 71 to be activated (as will comparators 67 and 68, but it will be of no consequence under the assumed conditions). It should be pointed out the the OD comparators 69 and 71 will generally be activated by signals with an amplitude about twice that of signals which will activate ID comparators 67 and 68, since the outside defect, being closer to the flux leakage coil, produces a larger signal than would an inside defect of the same magnitude with the exact ratio depending on wall thickness of the pipe.

Since comparators 69 and 71 would be activated under the assumed example, flip-flops 82 and 83 would be placed in the set position, thereby transmitting impulses to AND circuits 96 and 93, respectively. Hence, AND circuit 93 would be receiving impulses from both flip-flops 84 and 83, thereby energizing control device 113 (which in this instance could be a red light), thus indicating an *outside defect* of the reject level or magnitude. AND circuit 96 would be receiving impulses from flip-flops 82 and 84 (but not flip-flop 83); thus control device 112 would not be energized. Under the above assumed example, neither would control devices 109 and 111 be energized because no impulses would be received at AND circuits 92 and 94 from flip-flop 84.

Now let it be assumed that a reject level signal is picked up by the flux leakage coil, thereby producing a flux leakage input above an inside (ID) reject level, but there is no eddy current input signal. Under these facts, flip-flop 84 would remain in the reset position and would be transmitting a controlled impulse to AND circuits 92 and 94.

Flip-flops 79 and 81 will be placed in the set position and thereby transmit impulses to AND circuits 94 and 92, respectively.

Hence, AND circuit 92 would be receiving two impulses, which would thereby activate control device 111 (which in this case might be a red light) indicating an *inside defect* at least of the reject level of seriousness. AND circuit 94 would not be receiving impulses from flip-flop 81 and thus control device 109 would not be activated. Neither would control devices 112 and 113 be activated.

Now assume that the defect detected by magnetic responsive means produces a flux leakage input signal only at the outside (OD) caution level, and an eddy current input above the preset level, then only control device 112 would be activated, indicating an outside defect at the caution level of seriousness.

If there should only be a flux leakage input signal above the inside (ID) caution level, and no eddy current signal, then only control device 109 would be activated, indicating an inside defect at the caution level of seriousness.

As may be seen in FIG. 3, a particularly suitable coil arrangement comprises a pair of eddy current sensing coils 29 and 31 closely spaced together to operate as a unit, and separated only by a flux leakage sensing coil 32. In this manner, the three coils operate correlatively as a unit to simultaneouesly confront and sense anomalies in the same limited region of the pipe wall 11. In particular, it may be seen that the effective detection axis of the two eddy current coils 29 and 31 is perpendicular to the surface of the pipe wall 11, and is located coincident with the detection axis of the flux leakage coil 32.

Figure 9:
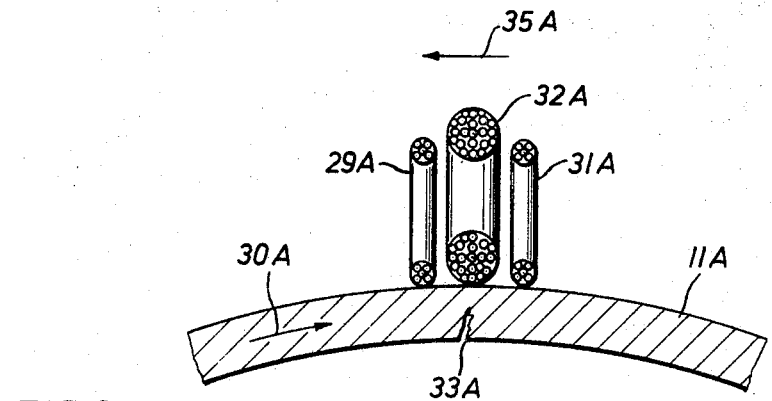
FIG. 9 is a simplified functional representation of an alternative form of the apparatus depicted in FIG. 3.

Accordingly, it will be apparent that the objects of the present invention are basically achieved by disposing eddy current and flux leakage coils in a manner whereby their relative detection axes are substantially coincident, since it is this substantial coincidence which permits their output signals to be correlated to provide a comprehensive flaw indication. However, as may be seen in FIG. 9, the detector may comprise two closely spaced together flux leakage sensing coils 29A and 31A which are separated by a single eddy current sensing coil 32A. As explained with respect to the apparatus illustrated in FIG. 3, the detector assembly may be moved along the exterior surface of the pipe wall 11A in the direction indicated by arrow 35A, and the path of the flux is indicated by arrow 30A. The detection axis of the coil assembly depicted in FIG. 9 is coincident with the detection axis of the eddy current coil 32A, and thus all three coils 29A, 31A and 32A will respond correlatively with respect to flaws in the exterior surface of the pipe wall 11A. In the case of flaw 33A which is located in the interior surface of the pipe wall, however, only the flux leakage coils 29A and 31A will respond whereby the resulting correlative detector signals will indicate its location.

Figure 10:
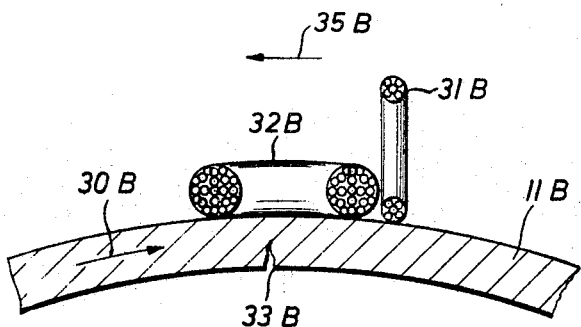
FIG. 10 is a simplified functional representation of another alternative form of the apparatus depicted in FIGS. 3 and 9.

Referring now to FIG. 10, there may be seen a further different alternative form of the apparatus illustrated generally in FIGS. 3 and 9. In particular, the detector assembly located adjacent the exterior surface of the pipe wall 11B may be seen to be composed of a single eddy current sensing coil 32B lying flat rather than vertical as depicted in FIGS. 3 and 9, together with a single flux leakage sensing coil 31B arranged in close, substantially abutting proximity thereto. Arrow 35B indicates the direction of movement of the detector, and arrow 30B indicates the flux path. In this coil arrangement, it will be apparent that the detection axis of the flux leakage coil 31B is not exactly coincident with the detection axis of the eddy current coil 32B, and thus this arrangement will not be quite as accurate as are the detector assemblies suggested or illustrated in FIGS. 3 and 9.

In those instances wherein the present invention is intended for use in detecting minute flaws such as weld discontinuities in new pipe being produced in a pipe mill, it is essential that the detector apparatus be as precise as possible. Accordingly, the detector assembly depicted in FIG. 10 is less desirable for such a purpose than are the detector assemblies illustrated or suggested in FIGS. 3 and 9.

This invention, while described in its operation with respect to outside inspection equipment, could be adapted for inspecting pipe from the inside by utilizing the same principles above taught, and coincidentally scanning the internal surface of the pipe wall.

Further modifications may be made in the invention as particularly described without departing from the scope of the invention. Accordingly, the foregoing description is to be construed illustratively only and is not to be construed as a limitation upon the invention as defined in the following claim.

What is claimed is:

1. An apparatus for coincidentally testing a magnetizable tubular member for both inside and outside defects and providing a readout for the location and relative size of said defects comprising:
   a first magnetizing means for establishing a unidirectional magnetic field in at least a portion of said tubular member,
   a second magnetizing means for coincidently producing eddy currents in the same portion of said tubular member in which said unidirectional magnetic field is established,
   a flaw detecting assembly positioned adjacent a surface of said portion comprising
      a pair of spaced apart coils connected to an eddy current detecting network for transmitting an an electrical impulse to a detecting circuit as an indication of an outside flaw,
      a third coil positioned between the coils of said pair of coils and coincidently responsive to flux leakage from said portion and transmitting signal to said detecting circuit as indications of defects in said tubular member,
   means for causing relative movement between said tubular member and said flaw detecting assembly, and
   said detecting circuit having readout means for discriminating between and separately indicating the relative size and location of individual defects.

References Cited

UNITED STATES PATENTS

| | | | |
|---|---|---|---|
| 1,946,196 | 2/1934 | Drake et al. | 324—37 |
| 2,729,785 | 1/1956 | Keevil | 324—37 |
| 2,744,233 | 5/1956 | Paivinen | 324—37 |
| 3,271,664 | 9/1966 | Mountz et al. | 324—37 |
| 3,340,466 | 9/1967 | Ono | 324—40 |
| 3,343,079 | 9/1967 | Crouch | 324—37 |

FOREIGN PATENTS 171,639  11/1965  Russia.

RUDOLPH V. ROLINEC, Primary Examiner

R. J. CORCORAN, Assistant Examiner